US011021773B2

(12) United States Patent
Suss et al.

(10) Patent No.: US 11,021,773 B2
(45) Date of Patent: Jun. 1, 2021

(54) PRODUCTION OF SCANDIUM-CONTAINING CONCENTRATE AND FURTHER EXTRACTION OF HIGH-PURITY SCANDIUM OXIDE FROM THE SAME

(71) Applicant: United Company RUSAL Engineering and Technology Centre LLC, g. Krasnoyarsk (RU)

(72) Inventors: Aleksandr Gennadievich Suss, Krasnoyarsk (RU); Aleksandr Borisovich Kozyrev, Krasnoyarsk (RU); Andrej Vladimirovich Panov, Krasnoyarsk (RU)

(73) Assignee: United Company RUSAL Engineering and Technology Centre LLC, Krasnoyarsk (RU)

( * ) Notice: Subject to any disclaimer, the term of this patent is extended or adjusted under 35 U.S.C. 154(b) by 32 days.

(21) Appl. No.: 16/323,192

(22) PCT Filed: May 4, 2017

(86) PCT No.: PCT/RU2017/000202
§ 371 (c)(1),
(2) Date: Feb. 4, 2019

(87) PCT Pub. No.: WO2018/026308
PCT Pub. Date: Feb. 8, 2018

(65) Prior Publication Data
US 2019/0161828 A1 May 30, 2019

(30) Foreign Application Priority Data
Aug. 4, 2016 (RU) .......................... RU2016132359

(51) Int. Cl.
C22B 59/00 (2006.01)
C22B 3/20 (2006.01)
(Continued)

(52) U.S. Cl.
CPC .............. C22B 59/00 (2013.01); C01F 17/00 (2013.01); C01F 17/10 (2020.01); C01F 17/206 (2020.01);
(Continued)

(58) Field of Classification Search
CPC .. C22B 59/00; C22B 3/12; C22B 3/22; C22B 3/24; C22B 3/08; C01F 17/206; C01F 17/10; C01F 17/00
(Continued)

(56) References Cited

U.S. PATENT DOCUMENTS

2012/0207656 A1* 8/2012 Duyvesteyn ............ C22B 59/00
423/21.1
2015/0307965 A1* 10/2015 Boudreault ............... C22B 3/44
423/21.5

FOREIGN PATENT DOCUMENTS

RU 2201988 C2 * 4/2003
RU 2247788 C1 * 3/2005
(Continued)

OTHER PUBLICATIONS

RU 2069181 C1, Nov. 20, 1996, abstract. (Year: 1996).*

Primary Examiner — Steven J Bos
(74) Attorney, Agent, or Firm — Hogan Lovells US LLP

(57) ABSTRACT

The invention relates to a method for producing a scandium-containing concentrate from the wastes of alumina production and extracting high-purity scandium oxide from the same. Provided is a method for producing a scandium-containing concentrate from a red mud, wherein the $Sc_2O_3$ content therein is least of 15 wt. %, the $TiO_2$ content not more than 3 wt. %, the $ZrO_2$ content not more than 15 wt. %, and wherein scandium in the concentrate is in form of a mixture of $Sc(OH)_3$ hydroxide with $ScOHCO_3 \cdot 4H_2O$. Also
(Continued)

provided is a method for producing high-purity scandium oxide, with a purity of approximately 99 wt. %.

15 Claims, 2 Drawing Sheets

(51) Int. Cl.
    *C01F 17/00*     (2020.01)
    *C22B 3/12*     (2006.01)
    *C01F 17/10*     (2020.01)
    *C01F 17/206*     (2020.01)

(52) U.S. Cl.
    CPC .................. *C22B 3/12* (2013.01); *C22B 3/20* (2013.01); *C01P 2006/80* (2013.01); *Y02P 10/20* (2015.11)

(58) Field of Classification Search
    USPC ................................................ 423/21.1, 21.5
    See application file for complete search history.

(56) References Cited

FOREIGN PATENT DOCUMENTS

| | | | |
|---|---|---|---|
| RU | 2257348 C1 | * | 7/2005 |
| RU | 2478725 C1 | * | 4/2013 |
| RU | 2536714 C1 | * | 12/2014 |

* cited by examiner

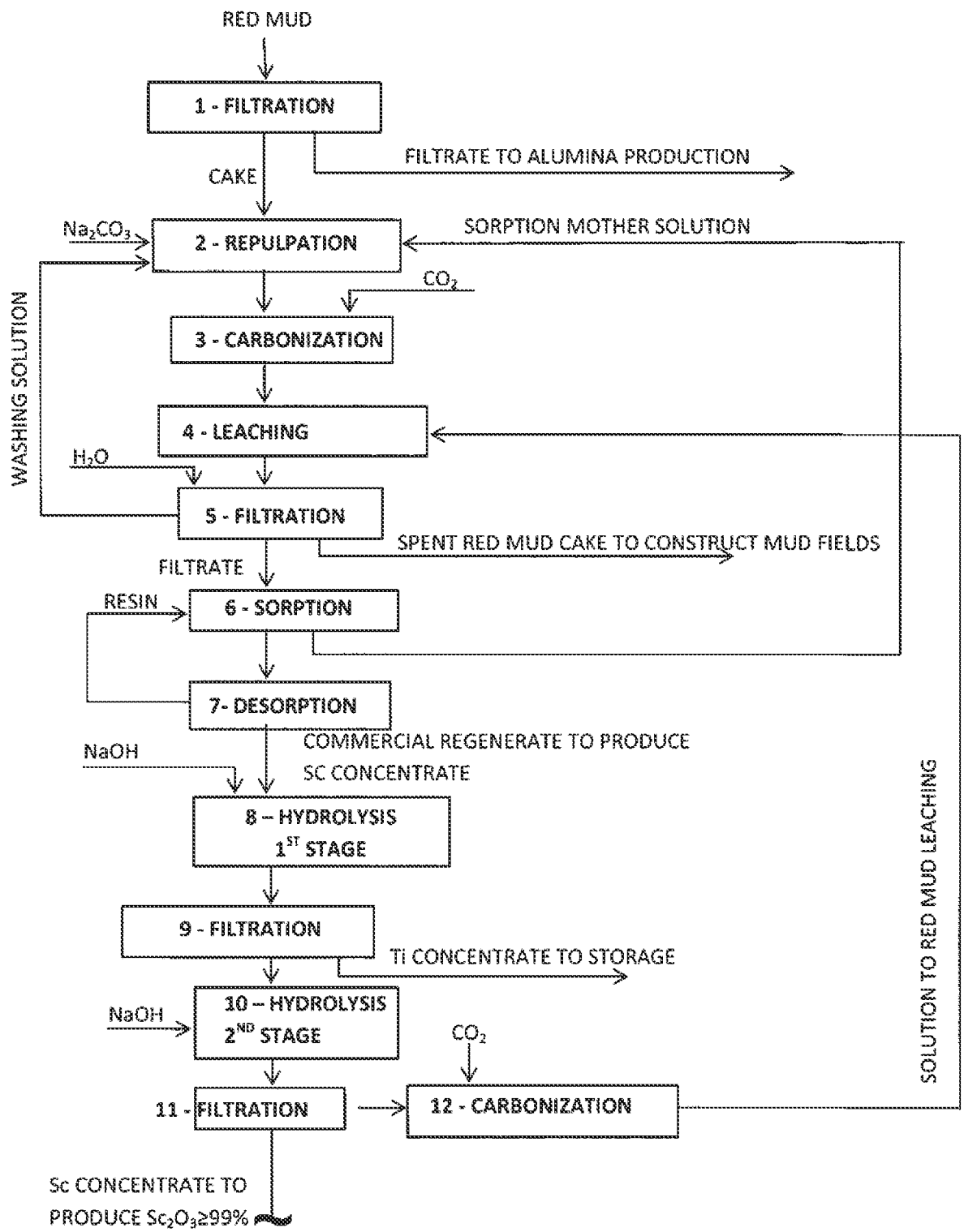

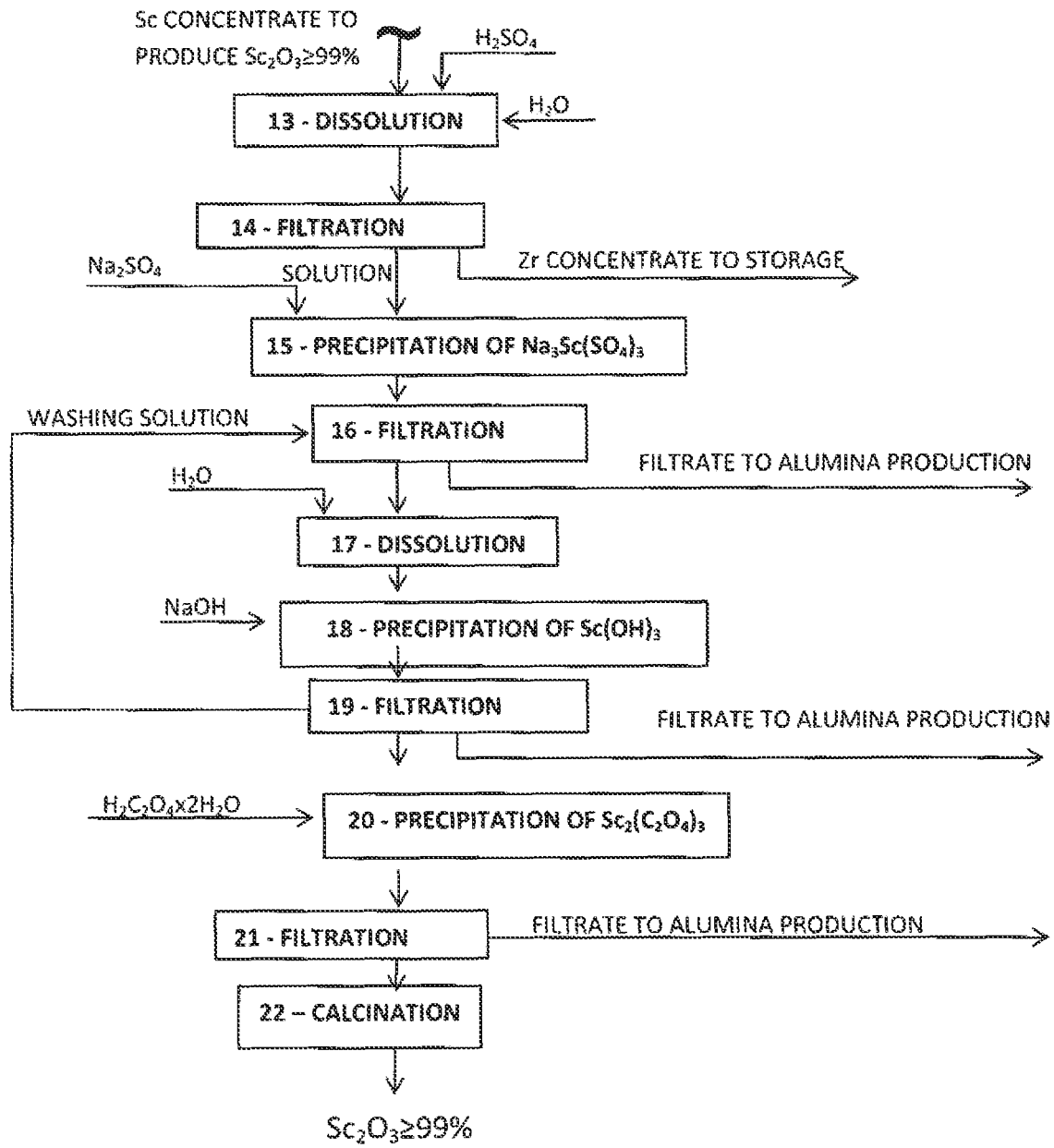

PRODUCTION OF SCANDIUM-CONTAINING CONCENTRATE AND FURTHER EXTRACTION OF HIGH-PURITY SCANDIUM OXIDE FROM THE SAME

CROSS REFERENCE TO RELATED APPLICATION

This application is a U.S. National Phase under 35 U.S.C. § 371 of International Application PCT/RU2017/000202, filed on Apr. 5, 2017, which is herein incorporated by reference in its entirety.

FIELD OF THE INVENTION

The invention relates to nonferrous metallurgy, particularly to a method for producing a scandium-containing concentrate from the wastes of alumina production and extracting a super high-purity scandium oxide from the same. The method comprises extracting scandium from large-tonnage wastes of aluminum production known as a red mud belonging to hazard class 5 according to the existing classification. Due to a high alkalinity of this waste, the areas in the vicinity of its storage site are unsuitable both for construction and agriculture. At the same time, the demand for trace and rare-earth metals is growing. First of all, scandium is of interest as a construction material for the rocket and aircraft construction industries and astronautics because having a melting temperature significantly higher than that of aluminum, it has the same density as aluminum. Added in amounts of tenths of a percent to aluminum and its alloys, metallic scandium provides for an improvement in the strength and in certain cases plastic properties, a growth in the resistance to corrosion cracking, twisting, enables welding characteristics of strained semi-products.

It is known that scandium is a classic trace element not occurring naturally in a free state, it forms no minerals and is available only industrially as $Sc_2O_3$ in the form of white powder. Scandium belongs to the most expensive metals on earth that are actively used in the innovation and high technologies as well as a component of high-strength and high corrosion-resistant light alloys. Scandium oxide is produced from the red mud, a waste of bauxite processing from which an intermediate product in the form of aluminum oxide or metallurgic alumina is produced as a raw material for producing aluminum and, ultimately, primary aluminum. Recycling of ecologically harmful wastes is a serious problem for aluminum production. However, the red mud has a high content of valuable metal oxides. The processes of extraction of these compounds make it possible to improve the properties of mud including but not limited to decreasing the alkali content and humidity so that costly burial of the red mud becomes unnecessary and create a source of additional profit for its use in the construction industry.

BACKGROUND OF THE INVENTION

Known is method for extracting scandium while processing bauxites into alumina, said process comprising leaching a raw product, then separating a solution from a precipitate, precipitating scandium by adding a solution containing an amphoteric collector metal hydroxide to a filtrate followed by filtering and washing the precipitate (RU patent No. 2201988, Apr. 10, 2003 r.). Among the disadvantages of this method are a low degree of scandium extraction from a raw product, i.e. the red mud, of less than 10% of $Sc_2O_3$ content in the raw red mud at each stage and obtaining a lean scandium concentrate (2-5% in terms of $Sc_2O_3$) enriched with a number of detrimental impurities (titanium, zirconium, aluminum, iron oxides, etc.).

Also known is a method for producing scandium oxide, said method comprising repeated successive leaching of the red mud with a mixture of sodium carbonate and hydrocarbonate solutions, washing and separating a precipitate, adding zinc oxide dissolved in sodium hydroxide to the resulting solution, keeping the solution at an elevated temperature while being stirred, separating and treating the same with a sodium hydroxide solution at a boiling temperature, separating, washing and drying the resulting product followed by extracting scandium oxide by the known methods (RU patent No. 2247788, 10, Mar. 2005). This method allows 58 grams of a richer scandium concentrate containing on average 30.0% by weight of $Sc_2O_3$ with the extraction ratio of scandium oxide from the same of 13.9% to be obtained per ton of the red mud. To achieve such content of $Sc_2O_3$ in the concentrate (~30.0%), repeated, at least 10-time recycling of a primary SC-containing solution for leaching a fresh batch of the red mud is required, which lowers the productivity of the overall process.

RU patent No. 2536714, 27 Dec. 2014 discloses an improved method for producing a scandium concentrate from the red mud, said method enabling an increase in the extraction ratio of scandium from the red mud into a primary SC-containing solution by carbonization leaching and obtainment of a productive solution free from concomitant impurities and more concentrated in terms of scandium before precipitating the scandium concentrate. This known method for producing a scandium concentrate taken for the prototype comprises successive carbonization leaching of the red mud with carbonate solutions while simultaneously gassing the mud pulp with an air-gas mixture $CO_2$, filtering the carbonized mud pulp to obtain a scandium-containing solution, successively separating scandium from concomitant impurity components while being appropriately concentrated, precipitating slightly soluble scandium compounds from the purified solution, filtering, washing and drying the precipitate to obtain a scandium concentrate. At the same time, carbonization leaching of the red mud by initial vibrocavitational treatment of the mud pulp, separating scandium from impurity components by appropriately concentrating the same from the resulting scandium-containing solution is carried out by sorption with phosphate ion exchangers, desorption of scandium from the organic phase of ion exchangers, wherein pulsating desorption is carried out using mixed carbonate-chloride solutions to obtain a scandium-containing eluate from which slightly soluble scandium compounds are stepwise precipitated, slightly soluble compounds of impurity components are first precipitated to separate a precipitate being titanium-zirconium concentrate and then a scandium concentrate is precipitated. The aspects of the method enable an increase in the extraction of scandium oxide into an end product (concentrate) of up to 23.5% on average.

It is known that the raw material for producing scandium oxide is the red mud resulting from the processing of ancient monohydrate bauxites in the North of Russia, said bauxites coming from:

The North Urals Bauxite Mine (NUBM)—$Sc_2O_3$ content ~80-120 ppm;

The Middle Timan Bauxite Mine (MTBM)—$Sc_2O_3$ content ~80 ppm;

The North Onega Bauxite Mine (NOBM)—$Sc_2O_3$ content ~150-250 ppm.

When producing alumina from these bauxites, strict processing modes are required, i.e. modes that destroy bauxite minerals and transfer scandium into a form soluble in a soda solution. The content of scandium in the red mud is twice as high as in original bauxite and it becomes by 50-80% more available for leaching with soda-bicarbonate solutions.

Bauxites from other main bauxite-bearing areas of the world (including Australia, Brazil, Jamaica, Guinea, etc.) contain 2-3 times less scandium, generally about 30 ppm with Sc remaining in the structure of minerals so that it cannot be extracted by soda-bicarbonate leaching.

It is a first object of the invention to provide a method for producing a scandium-containing concentrate, said method comprising a number of the following process stages for producing a scandium-containing concentrate while processing the red mud by soda-bicarbonate leaching (in accordance with the process chart shown in the accompanying FIGURE):

filtering the red mud from a liquid phase;
repulping a red mud cake with a soda-bicarbonate recirculated solution;
gassing the solution with carbon dioxide until a pH≤9 is achieved;
leaching the red mud with a soda-bicarbonate solution having $Na_2O_{total}$ content of at least 65 $g/dm^3$ at a temperature 80-85° C. for at least 3 hours and at a liquid-to-solid ratio of at least 3.5:1 (by weight);
filtering and washing the red mud cake on the filter with water;
sorbing scandium from a filtrate on a phosphate ion exchanger following which the recirculated solution is recycled for repulping the red mud cake;
desorbing scandium from the phosphate ion exchanger with a strong soda solution at a high temperature to obtain a strippant rich in scandium;
one or two stages of strippant hydrolysis to obtain a scandium-containing (scandium) concentrate at the second stage.

A second object of the proposed invention is to provide a method for extracting scandium oxide from a scandium-containing concentrate.

Known is a method for producing scandium oxide (RU patent No. 2069181, 20 Nov. 1996), comprising dissolving a scandium-containing concentrate in a mineral acid (as a rule sulfuric acid) by bringing the acid concentration in the solution to 260-400 $g/dm^3$, separating a precipitate of scandium sulfate from the solution, washing and dissolving the same in water, precipitating slightly soluble scandium compounds from the solution by treating, for example, with oxalic acid, washing, drying and calcining to obtain scandium oxide ($Sc_2O_3 \geq 99\%$). A disadvantage of the known method is a significant percentage of overall scandium loss (up to 11%), in particular because, when washing the precipitate of scandium sulfate with sulfuric acid at a concentration used to precipitate a scandium-containing concentrate, scandium solubility in sulfuric acid is a rather high, which results in its washout.

Also known is a method for producing scandium oxide (RU patent No. 2257348, 27 Jul. 2005), comprising dissolving a scandium-containing concentrate in a mineral acid (as a rule hydrochloric, sulfuric, nitric acid); purifying a scandium solution of impurities by treating with a sulfate-containing inorganic compound and then with barium chloride; treating the purified scandium solution with alkaline agents, in particular $NH_4OH$ to obtain slightly soluble scandium compounds: scandium oxyhydrate or hydrooxocarbonate; filtering pulp to separate a scandium precipitate from the solution; treating the precipitate with formic acid; separating a scandium formate precipitate from a mother solution; washing the precipitate with formic acid, drying and calcining the precipitate to obtain commercial scandium oxide with a purity of 99.99%. Among the disadvantages of the known method are the presence of multiple stages, for instance sulfate-containing inorganic compounds and barium chloride are added to the scandium solution at the first stage for removing impurities and then the scandium oxyhydrate precipitate is further treated with formic acid.

RU patent No. 2478725, 10 Apr. 2013 discloses a method for extracting scandium oxide from a scandium-containing concentrate, taken for the prototype. According to the known method for producing scandium oxide, a scandium-containing concentrate is dissolved in sulfuric acid, an acid-insoluble precipitate is removed, and scandium is precipitated in the presence of an ammonium compound. Then, the precipitate is filtrated, washed, dried and calcined to produce a scandium oxide precipitate. Once the acid-insoluble precipitate is removed, the sulfuric acid concentration in the filtrate is brought to 540-600 $g/dm^3$, and as an ammonium compound, ammonium chloride is used added to the solution in an amount of 26.7-53.5 $g/dm^3$ at 50-70° C. followed by keeping the same for 1-2 hours while being stirred.

The resulting precipitate is washed with ethanol at a volume ratio of 1-10÷11. The technical effect consists in a more simple process for producing commercial scandium oxide with a high purity and a yield of up to 97-98% from a lean scandium concentrate, for example, production wastes resulting from bauxite processing into alumina.

SUMMARY OF THE INVENTION

One of the above objects of the invention is achieved by providing a method for producing a scandium-containing concentrate from a red mud, said method comprising filtering the red mud from a liquid phase, repulping a red mud cake with a sodium bicarbonate recirculated solution, gassing the solution with carbon dioxide until a pH≤9 is achieved, leaching the red mud with a sodium bicarbonate solution, filtering and filter washing the red mud cake with water, sorbing scandium from the filtrate on a phosphate ion exchanger following which the recirculated solution is returned for repulping the red mud cake, desorbing scandium from phosphate ion exchanger with a strong soda solution at a high temperature to obtain a strippant rich in scandium, at least one stage of strippant hydrolysis to obtain a scandium-containing concentrate at the second stage. Unlike said prototype, carbonization leaching of the red mud is carried out at least in a single stage at 60-100° C., preferably 80-85° C. using a mixed solution of sodium carbonate and bicarbonate with a $Na_2O_{total}$ concentration of ≥60 $g/dm^3$, preferably 65-75 $g/dm^3$, wherein $Na_2O$ bicarbonate amounts to 50-100% of $Na_2O_{total}$ scandium is sorbed from the obtained scandium-containing solution on a phosphorous-containing ion exchanger at 40-100° C., scandium is desorbed from an ion exchanger organic phase using a sodium carbonate solution to obtain commercial regenerated scandium from which a scandium concentrate is precipitated, wherein the $Sc_2O_3$ content therein is least of 15 wt. % (in terms of dry matter), the $TiO_2$ content is not more than 3 wt. %, the $ZrO_2$ content is not more than 15 wt. %, and wherein scandium in the concentrate is in form of a mixture of $Sc(OH)_3$ hydroxide with $ScOHCO_3 \cdot 4H_2O$ basic salt. Preferably, if scandium is desorbed from the ion exchanger organic phase using a sodium carbonate solution with a $Na_2CO_3$ concentration of 160 to 450 $g/dm^3$ at 20-80° C., precipitation of the scandium-containing concentrate is advantageously carried out in two stages, wherein impurity components are precipitated at the first stage at a pH=10.5÷12.0 and a temperature of 60-80° C. and separated in the form of a precipitate from commercial regenerated scandium, and the scandium concentrate itself is precipitated at the second stage at a pH=12.5÷13/0.5 and a temperature of 70-80° C. Also preferably, the solution resulting from carbonization leaching of the red mud once scandium has been sorbed from the same, is gassed with an air-gas mixture containing $CO_2$ at 30-40° C. and is recycled for carbonization leaching of a fresh batch of the red mud. It is also advantageous to further adjust the weight ratio between $Sc_2O_3$ and $TiO_2$ in the concentrate to at least 5:1 (by weight) and the weight ratio between of $Sc_2O_3$ and $ZrO_2$ in the concentrate to at least 1.5 (by weight).

Therefore, a Sc-containing strippant is hydrolyzed in at least a single stage. This is possible due to a high selectivity of the used sorbent that practically sorbs no titanium from the filtrate. When desorbed from a resin, a strippant with low titanium content is obtained. Hydrolysis of such strippant in a single stage allows a concentrate with a ratio between $Sc_2O_3$ and $TiO_2$ of at least 5:1 (by weight) to be obtained. Also possible are other techniques for the separation of titanium from the strippant, for example, upon heating, thermal hydrolysis occurs so that titanium precipitates and the precipitate is filtered out. Therefore, the strippant may be hydrolyzed both in a single stage and in two stages.

By adjusting the weight ratio between the main components in the concentrate (namely, $Sc_2O_3$, $ZrO_2$ and $TiO_2$), a chemical analysis of these elements is meant, performed by inductively coupled plasma method (ICP AS). Based on the resulting values of content of these elements in oxide form, their weight ratio is calculated.

The main equipment used in the flowchart: reactors, mixers, pumps, sorption-desorption columns, nutsch filters, press-filters, thickener, etc., is the equipment widely used in the high chemical technology and hydrometallurgy. As already noted, the proposed technical solutions are directed to simplify the process and to reduce the production cost and, accordingly, to reduce the number of process steps and to simplify the flowchart. The main innovations consist in optimizing the leaching modes, using an efficient sorbent, optimizing the desorption modes, using the reaction of scandium reprecipitation through double salts of sodium and scandium sulfate, etc.

By the above method, a scandium-containing concentrate comprising a mixture of scandium, titanium, zirconium, iron, sodium oxides, hydroxides and carbonates is produced by a carbonate sorption-hydrolysis process. The $Sc_2O_3$ content therein is at least of 15 wt. % (in terms of dry matter), the $TiO_2$ content is not more than 3 wt. %, the $ZrO_2$ content is not more than 15 wt. %, wherein scandium in the concentrate is in the form of a mixture of $Sc(OH)_3$ hydroxide with $ScOHCO_3 \cdot 4H_2O$ basic salt.

Advantageously, the weight ratio between $Sc_2O_3$ and $TiO_2$ in the concentrate is not less than 5:1 (by weight) and the weight ratio between of $Sc_2O_3$ and $ZrO_2$ in the concentrate to at least 1.5 (by weight).

Another object of the invention is achieved by providing a method for producing high-purity scandium oxide, said method comprising dissolving a scandium-containing concentrate in sulfuric acid, removing an acid-insoluble precipitate, precipitating scandium, filtering, washing, drying and calcining to obtain a precipitate of scandium oxide. Unlike the prototype, once the acid-insoluble precipitate is removed, scandium from the filtrate is precipitated with sodium sulfate in the form of a double salt of sodium and scandium sulfate, filtered out, the resulting precipitate is washed with a sodium sulfate solution, the double salt is dissolved in water and scandium hydroxide is precipitated with caustic soda, then the cake is filtered, washed and added to a solution of oxalic acid to obtain scandium oxalate using oxalic acid, scandium oxalate is filtered out, washed with water, calcined to produce scandium oxide with a purity of up to 99 wt. %, preferably ≥99 wt. %. Scandium oxalate is preferably calcined at a temperature not lower than 650° C.

At the repurification stage of the Sc-containing concentrate according to the proposed method, two acids are used: sulfuric acid for dissolving the concentrate and oxalic acid for precipitating scandium in the form of oxalate. In the present case, the concentrate is dissolved in sulfuric acid. Caustic soda is the out-of-date name of the chemical compound NaOH or caustic alkali industrially used as a solution with a concentration of 42-45% or as granules 100% consisting of NaOH.

BRIEF DESCRIPTION OF THE DRAWING

The accompanying drawing shows a general flowchart illustrating all process steps for producing a scandium-containing concentrate and scandium oxide, including extracting scandium from the red mud by carbonization and sorption to obtain a scandium-containing strippant; producing a rich scandium-containing concentrate from a scandium-containing strippant; processing the scandium concentrate into scandium oxide with a $Sc_2O_3$ content of ≥99 wt. %.

The proposed process for producing scandium oxide shown in the flowchart comprises the following stages:

1—filtering a pulp from a red mud resulting from the main alumina production with a liquid-to-solid ratio of ≥2.5:1 (by weight). An alkaline solution is filter separated and recycled back to the alumina production while a red mud cake with a humidity of ≥25% is supplied for repulping using a sorption mother solution;

2—repulping the red mud cake using the sorption mother solution and wash water with a NaOH solution added thereto to obtain a predetermined concentration of $Na_2O_{total}$ in a liquid phase and a predetermined liquid-to-solid ratio;

3—carbonizing the mud pulp by bubbling through the same an air-gas mixture containing carbon dioxide to turn a part of $Na_2CO_3$ soda into $NaHCO_3$ bicarbonate with a pH≤9;

4—soda-bicarbonate leaching of scandium from red mud to turn scandium into liquid phase;

5—filtering and filter washing with water the leached pulp to remove the leached red mud cake for storage and to supply the filtrate to the sorption stage;

6—sorbing scandium from the filtrate on a resin and recycling the sorption mother solution back to repulping stage 2;

7—desorbing scandium from the resin with a soda solution to supply a scandium-containing strippant to the hydrolysis stage;

8—first stage hydrolysis of a scandium-containing solution at a pH=10.5÷12;

9—filtering and filter washing a Ti-containing concentrate to supply the same for storage and to pump the filtrate out to the second stage hydrolysis;

10—first stage hydrolysis of a scandium-containing solution at a pH≥12.5;

11—filtering and filter washing a scandium-containing concentrate to supply the same for repurification and to supply the filtrate to carbonization stage 12;

12—carbonizing the filtrate with an air-gas mixture containing carbon dioxide to reduce its pH from 12.5 to 9-10 for further pumping the resulting solution to red mud leaching stage 4;

13—dissolving the scandium-containing concentrate in sulfuric acid to turn scandium into solution;

14—filtering and filter washing an acid-insoluble precipitate comprising a Zr-containing concentrate to supply the same for storage and to pump out the scandium-containing solution to stage 15;

15—precipitating scandium with sodium sulfate to obtain double sodium and scandium sulfate;

16—filtering and filter washing a cake of double sodium and scandium salt;

17—dissolving double sodium and scandium sulfate with water;

18—precipitating scandium with caustic alkali to obtain a hydroxide;

19—filtering and filter washing the pulp to obtain a cake scandium hydroxide;

20—turning scandium hydroxide into scandium oxalate;

21—filtering and filter washing scandium oxalate;

22—calcining scandium oxalate at a temperature not lower than 650° C. to obtain commercial scandium oxide with a purity of ≥99 wt. %.

DETAILED DISCLOSURE

One of the objects of the proposed method for producing a scandium-containing concentrate is to achieve maximally high scandium content in the concentrate while processing the red mud.

The above object is achieved by providing the following main innovations in the known process:

1) increasing the leaching temperature from 60-65° C. to 80-85° C., i.e. the process is performed where the leaching agent, $NaHCO_3$ sodium bicarbonate, is thermally instable and dissociates into $Na_2CO_3$ and $CO_2$. The presence of a free carbonate radical facilitates the increased extraction of scandium the from red mud;

2) increasing the concentration of $Na_2O_{total}$ to ≥65 g/dm$^3$, i.e. the process is performed using solutions oversaturated in terms of bicarbonate;

3) selecting an efficient phosphate ion exchanger having a high selectivity with respect to scandium and a low selectivity with respect to zirconium.

Fundamentally new techniques of scandium desorption from a phosphate ion exchanger using strong soda solutions at a high temperature enable a desorption value to be achieved of up to 95% without using chloride solutions, which is one of the main advantages of the invention. At the same time, a rich scandium eluate is obtained from which a scandium-containing concentrate comprising a mixture of scandium, titanium, zirconium, iron, sodium oxides, hydroxides and carbonates is produced by the carbonate sorption-hydrolysis process with the scandium content in terms of oxide being from 15 to 75 wt. % in the form of $Sc(OH)_3$ hydroxide or in a mixture with $ScOHCO_3$ basic salt.

An optimum ratio between $Sc_2O_3$ and $TiO_2$ in the concentrate of at least 5:1 (by weight) was further selected, allowing a simple and low-cost process to be used for obtaining pure scandium oxide from the same with a $Sc_2O_3$ content of ≥99 wt. % (in the calcined product). The ratio between $Sc_2O_3$ and $ZrO_2$ in the concentrate should be preferably at least 1.5:1 (by weight), also allowing a simple and low-cost process to be used for obtaining pure scandium oxide from the same with a $Sc_2O_3$ content of ≥99 wt. % (in the calcined product).

The obtained scandium-containing concentrate, subject to its chemical and phase composition and component ratio, allows a simple and low-cost process to be further used for obtaining pure scandium oxide from the same with a $Sc_2O_3$ content of ≥99 wt. % (in the calcined product) with practically no rare-earth metals contained therein, including radionuclides (uranium and thorium).

The scandium-containing concentrate composition obtained by the proposed method allows pure scandium oxide to be produced from the same according to a simple flowchart without using strong acids and expensive acid-resistant equipment and without using the extraction with venomous organic extractants.

In general, the final composition of the scandium-containing concentrate is dependent on selecting and optimizing a number of the following red mud processing modes:

temperature of carbonate leaching, sorption-desorption, hydrolysis;

concentration and composition of solutions used for leaching, sorption-desorption, hydrolysis;

time of leaching, sorption-desorption, hydrolysis;

production of pulps and sorbents including a liquid-to-solid ratio, gassing with carbon dioxide, linear feed rate of sorption and desorption solution, etc.;

selecting a pH value for leaching, sorption-desorption, hydrolysis.

Selecting and optimizing said modes enable a scandium-containing concentrate comprising a mixture of scandium, titanium, zirconium, iron, sodium oxides, hydroxides and carbonates to be obtained by the carbonate sorption-hydrolysis process.

It is essential for the concentrate composition that the $Sc_2O_3$ content should be at least of 15 wt. % (in terms of dry matter), the $TiO_2$ content not more than 3 wt. % and the $ZrO_2$ content not more than 15 wt. %. Scandium is present in the concentrate in the form of a mixture of $Sc(OH)_3$ hydroxide and $ScOHCO_3.4H_2O$ basic salt. The weight ratio between $Sc_2O_3$ and $TiO_2$ in the concentrate is above 5:1 (by weight), allowing a simple and low-cost process to be used for obtaining pure scandium oxide from the same with a $Sc_2O_3$ content of ≥99 wt. % (in the calcined product). Said $TiO_2$ content of ≤3 wt. % allows a simple and low-cost process to be used in the process of further repurification for obtaining pure scandium oxide from the same with a $Sc_2O_3$ content of ≥99 wt. % (in the calcined product).

The proposed method for repurification of a scandium-containing concentrate is unique in that scandium is precipitated from a sulfuric solution using sodium sulfate in the form of a sodium and scandium sulfate double salt rather than using a strong acid in the form of scandium sulfate.

At a $Sc_2O_3$ content in the concentrate of less than 15 wt. % (in terms of dry matter), the process for repurifying the concentrate to a SO 99 commercial product (i.e. with a scandium oxide content of ≥99 wt. %) becomes significantly more complicated, the secondary losses of scandium while being repurified together with repurification tailings amount to 30% and more, and the operating costs for repurification exceed 300 US/kg of SO 99 as shown below in Table 1.

TABLE 1

| Example No. | $Sc_2O_3$ content in the concentrate, wt. % (in terms of dry matter) | Repurification cost, US$/kg of SO 99 | $Sc_2O_3$ losses, % (of initial content in the concentrate) | Number of repurification steps |
|---|---|---|---|---|
| 1 | 10 | 450 | 40 | 5 |
| 2 | 50 | 180 | 10 | 3 |

When using a lean concentrate ($Sc_2O_3$<15 wt. %), it will be needed to increase the number of the steps of dissolving the concentrate in sulfuric acid and again precipitating scandium with strong sulfuric acid in order to achieve the required purity of scandium oxide. Each additional process step is a source of secondary losses of scandium with tailings and makes the process considerably more expensive.

At a $TiO_2$ content of >3 wt. %, no concentrate with required purity can be obtained so that so that it will be needed to dissolve again the double salt in sulfuric acid and to precipitate again sodium sulfate. It results in increased losses and a more expensive process as shown below in Table 2.

TABLE 2

| Example No. | $Sc_2O_3$ content in the concentrate, wt. % (in terms of dry matter) | $Sc_2O_3:TiO_2$ | Repurification cost, US$/kg of SO 99 | $Sc_2O_3$ losses, % (of initial content in the concentrate) | Number of repurification steps | $TiO_2$ in OC 99, wt. % |
|---|---|---|---|---|---|---|
| 3 | 30 | 5 | 400 | 30 | 4 | >0.1 |
| 4 | 30 | 10 | 250 | 10 | 3 | ≤0.05 |
| 5 | 15 | 5 | 350 | 20 | 3 | ≤0.1 |
| 6 | 10 | 2 | 500 | 40 | 5 | >0.15 |

At a $ZrO_2$ content in the concentrate not exceeding 15 wt. %, a simple and low-cost process may be used for producing pure scandium oxide from the same with a $Sc_2O_3$ content of ≥99 wt. % (in the calcined product) during further repurification. At a $ZrO_2$ content of >15 wt. %, no concentrate with required purity can be obtained so that it will be needed to dissolve again the double salt in sulfuric acid and to precipitate again sodium sulfate. It results in increased losses and a more expensive process as shown below in Table 3.

TABLE 3

| Example No. | $Sc_2O_3$ content in the concentrate, wt. % (in terms of dry matter) | $Sc_2O_3:ZrO_2$ | Repurification cost, US$/kg of SO 99 | $Sc_2O_3$ losses, % (of initial content in the concentrate) | Number of repurification steps | $ZrO_2$ in OC 99, wt. % |
|---|---|---|---|---|---|---|
| 7 | 20 | 0.5 | 280 | 30 | 3 | ≥0.5 |
| 8 | 20 | 1.5 | 550 | 10 | 5 | <0.2 |
| 9 | 15 | 1 | 350 | 20 | 3 | 0.3 |
| 10 | 10 | 1.5 | 650 | 50 | 5 | ≥0.5 |

The method for producing a scandium concentrate from red mud is illustrated by the following examples.

Carbonization leaching of scandium is carried out using an industrial pulp of the source red mud with the following average chemical composition:

solid phase, wt. %: 41.0 $Fe_2O_{3total}$; 13.0 $Al_2O_3$; 7.5 CaO; 13.0 $SiO_2$; 4.50 $TiO_2$; 5.5 $Na_2O$; 0.0140 $Sc_2O_3$; 0.14 $ZrO_2$;

liquid phase, g/dm³: 5.5 $Na_2O_{total}$; 3.0 $Al_2O_3$; pH 12.5; liquid-to-solid ratio in the pulp is on average 3.0 (by weight).

Example 1

In a carbonizing apparatus ($V_{effective}$=30.0 m³) having a gas bubbler, a steam register and a mixer, scandium was leached from the red mud at a liquid-to-solid ratio of at least 4 using a soda-bicarbonate solution, with a $NaHCO_3$ content in the pulp=80÷110 g/dm³, a $Na_2CO_3$ content=45÷60 g/dm³ and at a temperature=80÷85° C. The total duration of the leaching process was 3 hours, wherein before leaching, the mud pulp was gassed with an air-gas mixture containing 97-99% (by volume) of $CO_2$ at a pulp temperature of 35-45° C.

Once the general leaching process of scandium was competed, the carbonized mud pulp was filtered and the resulting primary SC-containing solution with the following chemical composition, g/dm³: 65.0 $Na_2O_{total}$; 97.0 $NaHCO_3$; 50.0 $Na_2CO_3$; 0.007 $Al_2O_3$; 0.012 $Sc_2O_3$; 0.140 $TiO_2$; 0.180 $ZrO_2$; 0.020 $Fe_2O_3$; pH 8.8÷9.2 was supplied to the stage of scandium sorption extraction and concentration (see Example 2).

Table 4 shows the experimental results of the red mud carbonization leaching and extracting scandium into a solution in accordance with the parameters of the claimed invention and also going beyond the optimum parameters.

The optimum conditions of scandium oxide carbonization leaching from the red mud (1-4) are the following: liquid-to-solid ratio of at least 4, $NaHCO_3$ sodium hydrocarbonate and $Na_2CO_3$ soda concentration in the mud pulp liquid phase, respectively, of 80÷110 g/dm³ and 45÷60 g/dm³, duration of 3 hours, process temperature of 80-85° C.

Under these conditions, a considerable increase by ~4.0÷9.0% in the $Sc_2O_3$ extraction from the red mud was achieved compared to the prototype (from the initial $Sc_2O_3$ content).

Below the optimum parameters (5-10), no positive effect consisting in $Sc_2O_3$ extraction from the red mud is present, i.e. it is either lower than that of the prototype (5, 6, 8, 9 and 10) or comparable to the prototype (7).

When exceeding the optimum parameters (11-12), despite a certain increase in $Sc_2O_3$ extraction to 30.1÷30.5%, the process is inexpedient because the concentration of $Na_2O_{total}$ has to be considerably increased to 70 g/dm$^3$, which will result in impaired sorption characteristics.

the concentrate and the yield of the latter are according to the parameters of the claimed invention and also beyond the optimum parameter limits.

According to Table 5, the optimum conditions of scandium sorption from a mother solution are the following:

TABLE 4

Experimental results of scandium extraction under optimum conditions of the red mud carbonization leaching, all other conditions being equal (see the text)

| | Leaching parameters | | | | |
|---|---|---|---|---|---|
| Experiment No. | NaHCO$_3$ Na$_2$CO$_3$ concentration, g/dm$^3$ | Liquid-to-solid ratio in the pulp | Leaching temperature, °C. | Leaching time, hours | Sc$_2$O$_3$ extraction, % |
| According to the prototype | | | | | 21.0 |
| Optimum parameter limits | | | | | |
| 1 | 80/60 | 4.0 | 80 | 3.0 | 25.0 |
| 2 | 95/50 | 4.5 | 85 | 3.0 | 28.0 |
| 3 | 110/45 | 4.5 | 80 | 3.0 | 28.0 |
| 4 | 100/50 | 5.0 | 85 | 3.0 | 30.0 |
| Beyond optimum parameter limits | | | | | |
| 5 | 105/35 | 4.0 | 80 | 3.0 | 19.0 |
| 6 | 110/45 | 3.5 | 85 | 3.0 | 20.0 |
| 7 | 100/50 | 4.5 | 80 | 2.0 | 22.0 |
| 8 | 100/50 | 4.0 | 80 | 1.0 | 18.0 |
| 9 | 110/45 | 4.5 | 70 | 3.0 | 10.0 |
| 10 | 110/45 | 4.5 | 60 | 3.0 | 5.5 |
| 11 | 100/50 | 4.5 | 80 | 6.0 | 30.1 |
| 12 | 135/50 | 4.0 | 85 | 3.0 | 30.5 |

Example 2

A SC-containing solution was produced at the first stage under optimum conditions described in Example 1.

At the second stage, scandium was sorbed from a solution containing, g/dm$^3$: 65.0 of $Na_2O_{total}$; 97.0 of $NaHCO_3$; 50.0 of $Na_2CO_3$; 0.007 of $Al_2O_3$; 0.012 of $Sc_2O_3$; 0.140 of $TiO_2$; 0.180 of $ZrO_2$; 0.020 of $Fe_2O_3$; pH 8.8-9 on LEWATIT® TP-260 phosphorous-containing ion exchanger.

Other equal conditions are:
optimum mode of scandium oxide carbonization leaching of the red mud;
scandium desorption conditions: eluting solution –320-350 g/dm$^3$ of $Na_2CO_3$, linear feed rate of the solution through a resin layer—0.25-0.3 m/hour, temperature—40-45° C.; (see Table 3);
precipitation conditions of Ti—Zr concentrate are the following: τ=70-80° C., pH-10.0÷10.5, τ=1.0÷1.5 hour (see Table 4);
precipitation conditions of Sc concentrate: pH=12.0÷12.5, t=70-80° C., τ=0.5÷1.0 hour.

Table 5 shows the experimental results of sorption extraction, wherein the linear feed rate of a mother solution through a resin layer and its temperature, $Sc_2O_3$ content in linear feed rate of a Sc-containing mother solution: 1.0÷2.0 m/hour;
process temperature: 70-80° C.

At the same time, $Sc_2O_3$ content in a primary concentrate is ~25.0-60.0% with $Sc_2O_3$ extraction being of ~29.5 g against ~20.7 g of $Sc_2O_3$/t of red mud (dry) according to the prototype, i.e. on average 1.4 less than in the claimed invention.

Below the optimum sorption parameters as related to the process temperature (5 and 6), the end-to-end extraction of scandium oxide into an end product (concentrate) is 17.1÷18.5%, which is lower than according to the prototype while at a lower linear feed rate of the solution through a resin layer (7 and 8), the end-to-end extraction scandium oxide into an end product (concentrate) is 29.7÷29.9%, which is higher than according to the prototype, but these sorption rates are inexpedient for carrying out the process because of a significant enlargement of the sorption equipment.

When exceeding the optimum sorption parameters as related to the linear feed rate of the solution through a resin layer or the process temperature (9 and 10), the end-to-end extraction of scandium oxide into a concentrate is either significantly lower (9) or higher (10) than according to the prototype with the scandium oxide content in an end product (concentrate) being 59.9% against 27.0% according to the prototype.

TABLE 5

Experimental results of scandium sorption from for a carbonate solution using Lewatit TP-260 under optimum conditions, all other conditions being equal (see the text)

| Experiment No. | Process parameters | | Scandium concentrate characteristic | | |
|---|---|---|---|---|---|
| | Linear rate of solution, m/h | Temperature, °C. | $Sc_2O_3$ Content, % | Concentrate yield, g/t of red mud | $Sc_2O_3$ Extraction, % |
| According to the prototype | | | 27.0 | 108.9 | 20.7 |
| Optimum parameter limits | | | | | |
| 1 | 1.0 | 70 | 55.0 | 73.8 | 29.0 |
| 2 | 1.5 | 80 | 45.5 | 88.6 | 28.8 |
| 3 | 2.0 | 75 | 25.7 | 155.3 | 28.0 |
| 4 | 1.0 | 80 | 59.8 | 69.1 | 29.5 |
| Beyond optimum parameter limits | | | | | |
| 5 | 1.5 | 40 | 23.5 | 101.9 | 17.1 |
| 6 | 1.5 | 50 | 26.0 | 99.6 | 18.5 |
| 7 | 0.25 | 70 | 60.5 | 69.2 | 29.9 |
| 8 | 0.50 | 80 | 60.2 | 69.1 | 29.7 |
| 9 | 4.5 | 80 | 20.5 | 86.7 | 12.7 |
| 10 | 1.5 | 90 | 59.9 | 69.6 | 29.8 |

Example 3

A SC-containing solution was produced under optimum conditions described in Example 1 and scandium was sorbed from said solution on LEWATIT® TP-260 ion exchanger under optimum conditions described in Example 2.

Table 6 shows the experimental results of scandium desorption from LEWATIT® TP-260 ion exchanger phase using an elution solution containing $Na_2CO_3$ under counterflow conditions and with the following process parameters: $Na_2CO_3$ concentration in desorption solution, linear feed rate of the desorption solution through an ion exchanger layer and its temperature being under optimum conditions in accordance with the parameters of the claimed invention and also beyond the optimum parameter limits.

TABLE 6

Experimental results of scandium desorption using a carbonate solution under optimum conditions, all other conditions being equal (see the text)

| Experiment No. | Process parameters | | | $Sc_2O_3$ concentration in eluate, g/dm³ | $Sc_2O_3$ extraction into eluate, % |
|---|---|---|---|---|---|
| | Linear rate of solution, m/h | Concentration $Na_2CO_3$ in solution, g/dm³ | Temperature, °C. | | |
| Optimum parameter limits | | | | | |
| 1 | 0.3 | 320 | 40 | 0.53 | 98.5 |
| 2 | 0.25 | 350 | 40 | 0.79 | 99.5 |
| 3 | 0.25 | 340 | 40 | 0.73 | 99.0 |
| 4 | 0.3 | 340 | 45 | 0.75 | 99.2 |
| 5 | 0.3 | 350 | 45 | 0.80 | 99.8 |
| Beyond optimum parameter limits | | | | | |
| 6 | 0.25 | 300 | 45 | 0.50 | 97.0 |
| 7 | 0.25 | 250 | 45 | 0.27 | 90.0 |
| 8 | 0.25 | 200 | 45 | 0.07 | 46.0 |
| 9 | 0.25 | 150 | 45 | 0.01 | 25.0 |
| 10 | 1.0 | 350 | 45 | 0.23 | 86.0 |
| 11 | 0.3 | 350 | 60 | 0.81 | 99.9 |
| 12 | 0.3 | 340 | 30 | 0.79 | 99.5 |

Optimum conditions of scandium desorption:

linear rate of elution solution (320-350 g/dm³ of $Na_2CO_3$) is 0.25-0.30 m/hour;

$Na_2CO_3$ concentration in the solution is 320-350 g/dm³;

eluate temperature is 40-45° C., wherein at higher temperatures, the solution concentrates by evaporation, its concentration increases and, as a consequence, the solution crystallizes, and at lower temperatures, the saturated solution is instable, which also results in its crystallization so that the process becomes impracticable.

Below the optimum parameter limits (6, 7, 8 and 9,) the concentration of scandium in the resulting eluate becomes significantly lower and its extraction into eluate goes down to ≤90.0% (7, 8 and 9), a minimally acceptable extraction ratio of a valuable component by desorption. At a lower temperature of eluate (12), the desorption process becomes impracticable because of the risk of crystallization of the desorption solution.

After desorption, the resulting eluate containing, g/dm³: 0.35 of $TiO_2$, 0.17 of $ZrO_2$ and 0.78 of $Sc_2O_3$ was purified coarsely purified of impurity elements (Ti, Zr) concomitant with scandium to further obtain a scandium concentrate with a high $Sc_2O_3$ content as the end product.

Table 7 shows the experimental results of the purification of a Sc-containing eluate under optimum conditions according to the present invention as well as beyond the optimum parameter limits.

The optimum conditions of precipitation of a Ti—Zr concentrate (1-5) are:

temperature=70÷80° C.;

pH=10.0÷10.5;

duration of 1÷1.5 hour.

As a result, a maximum purification factor is achieved, i.e. a ratio of a scandium concentration in eluate being purified to an overall concentration of impurity components (Ti+Zr) of 14÷19.5 against 1.5 in the stock eluate.

TABLE 7

Experimental results of the purification of a Sc-containing eluate of impurity components (titanium and zirconium) under optimum conditions, all other conditions being equal (see the text)

| Experiment No. | Process parameters | | | Concentration of components, g/dm³ | | | $MeO_2$:$Sc_2O_3$ ratio | | Purification factor*⁾ |
|---|---|---|---|---|---|---|---|---|---|
| | t, ° C. | pH | τ, hour | $TiO_2$ | $ZrO_2$ | $Sc_2O_3$ | $Sc_2O_3$:$TiO_2$ | $Sc_2O_3$:$ZrO_2$ | |
| Stock eluate | | | | 0.35 | 0.17 | 0.78 | 2.23 | 4.59 | 1.5 |
| 1 | 80 | 10.0 | 1.0 | 0.015 | 0.04 | 0.778 | 51.9 | 19.45 | 14.15 |
| 2 | 75 | 10.5 | 1.0 | 0.005 | 0.035 | 0.775 | 155.0 | 22.14 | 19.38 |
| 3 | 70 | 10.0 | 1.5 | 0.018 | 0.043 | 0.779 | 43.28 | 18.12 | 12.73 |
| 4 | 70 | 10.3 | 1.5 | 0.014 | 0.039 | 0.774 | 55.29 | 19.85 | 14.60 |
| 5 | 75 | 10.2 | 1.0 | 0.014 | 0.037 | 0.776 | 55.43 | 20.97 | 15.22 |
| Beyond optimum parameter limits | | | | | | | | | |
| 6 | 60 | 10.5 | 1.0 | 0.09 | 0.14 | 0.779 | 8.66 | 5.56 | 3.39 |
| 7 | 80 | 8.5 | 1.5 | 0.32 | 0.17 | 0.78 | 2.44 | 4.59 | 1.59 |
| 8 | 80 | 9.0 | 1.5 | 0.28 | 0.17 | 0.78 | 2.79 | 4.59 | 1.73 |
| 9 | 80 | 9.5 | 1.5 | 0.30 | 0.17 | 0.78 | 2.60 | 4.59 | 1.66 |
| 10 | 75 | 10.5 | 3.0 | 0.013 | 0.031 | 0.773 | 59.46 | 25.94 | 17.57 |
| 11 | 80 | 10.0 | 0.5 | 0.014 | 0.13 | 0.772 | 55.14 | 5.94 | 5.36 |
| 12 | 95 | 10.5 | 1.5 | 0.013 | 0.032 | 0.70 | 53.85 | 21.88 | 15.56 |

*⁾Purification factor - a ratio of scandium concentration in eluate to an overall concentration of impurity components (Ti + Zr).

When exceeding the optimum limits as related to the linear rate of the elution solution (10), both the $Sc_2O_3$ concentration in eluate and the extraction ratio into eluate of <90% are also insufficient, which is associated now with an excessively high specific load in terms of the elution solution, leading first of all to a lower $Sc_2O_3$ concentration in eluate due to an increased volume of the elution solution and also to a diffused front line of the desorption process. At a higher eluate temperature (11), the desorption process becomes impracticable because of the risk of crystallization of the desorption solution due to evaporation.

Example 4

A SC-containing solution was produced as described in Example 1, scandium was sorbed with LEWATIT® TP-260 ion exchanger under optimum conditions described in Example 2, and scandium was desorbed from the ion exchanger phase with a carbonate solution under optimum conditions described in Example 3.

Below the optimum parameter limits (6, 7, 8, 9 and 11), the purification of Sc-containing eluate of impurity components (Ti, Zr) is inefficient with the purification factor of -1.6÷5.4 so that an end product (concentrate) with a low $Sc_2O_3$ content is further produced.

When the purification process of Sc-containing eluate exceeds an optimum limit in terms of duration (10), although a higher purification factor of 17.57 is achieved, it does not result in significant purification efficiency and is within the range of 14÷19.5 optimum for the process so that only excessive energy consumption occurs. When purified at higher parameter values: t=95° C., pH=10.5 and duration of 1.5 hour, a purification factor of 15.56 is achieved, however, with significant losses of scandium: $Sc_2O_3$ concentration in eluate goes down from c 0.78 to 0.70 g/dm³ or by 10.3%.

Example 5

A SC-containing solution was obtained from red mud under optimum conditions described in Example 1, sorption and desorption of scandium was performed under optimum conditions described in Examples 2 and 3, respectively, and the resulting Sc-containing eluate was purified of impurity components under optimum conditions described in Example 4.

The resulting purified Sc-containing eluate containing, g/dm$^3$: 0.014 of $TiO_2$, 0.036 of $ZrO_2$ and 0.773 of $Sc_2O_3$, pH of 10.5 was further used to precipitate a primary scandium concentrate.

Table 8 shows the experimental results of scandium precipitation (production of concentrate as the end product) at optimum values of pH, temperature and duration as well as beyond the optimum parameter limits.

TABLE 8

Experimental results of scandium precipitation from purified eluate, all other conditions being equal (see the text)

| Experiment No. | Process parameters | | | Scandium concentrate characteristic | | |
|---|---|---|---|---|---|---|
| | pH | t. °C. | Duration, hours | Concentrate $Sc_2O_3$ content, wt. % | yield, g/t of red mud | $Sc_2O_3$ extraction into concentrate, % |
| According to the prototype | | | | 27.0 | 108.9 | 20.7 |
| Optimum parameter limits | | | | | | |
| 1 | 12.5 | 75 | 0.5 | 35.0 | 115.6 | 28.9 |
| 2 | 12.0 | 80 | 1.0 | 60.3 | 65.0 | 28.0 |
| 3 | 12.5 | 80 | 0.5 | 25.8 | 157.4 | 29.0 |
| 4 | 12.5 | 75 | 1.0 | 45.0 | 91.8 | 29.1 |
| Beyond optimum parameter limits | | | | | | |
| 5 | 12.0 | 60 | 1.0 | 34.3 | 79.2 | 19.4 |
| 6 | 11.0 | 80 | 1.0 | 23.6 | 57.5 | 9.7 |
| 7 | 11.5 | 80 | 1.0 | 32.3 | 77.2 | 17.8 |
| 8 | 12.5 | 90 | 0.5 | 25.0 | 164.1 | 29.3 |
| 9 | 12.5 | 95 | 1.0 | 23.5 | 175.7 | 29.5 |
| 10 | 12.0 | 75 | 3.5 | 47.0 | 85.2 | 28.6 |

The optimum conditions of production of a primary scandium concentrate are:
temperature 70÷80° C.;
pH 12.0÷12.5;
process duration of 0.5÷1.0 hour.

As a result, the following production figures are achieved: $Sc_2O_3$ content in the resulting concentrate is on average 25.0÷60.0% with the extraction ratio of 28.0÷29.1% against 27.0% and 20.7% according to the prototype.

Although a high $Sc_2O_3$ content of 23.6.0÷34.3% in the concentrate exceeding on average the one according to the prototype (27.0%) is achieved below the optimum parameter limits of pH and the process temperature (5, 6 and 7), the end-to-end extraction from the red mud of 15.6% is less than the extraction ratio of 20.7% according to the prototype.

When the process is performed under optimum conditions but its duration is 3.5 hours (10), the $Sc_2O_3$ content in the resulting concentrate is 47.0% with the extraction ratio of 28.6%, i.e. within the limits of the optimum process conditions ($Sc_2O_3$ content of 25.0-60.0% with the extraction ratio 28.0-29.1%) so that only excessive energy consumption occurs.

When the process is performed at an optimum pH but at an elevated temperature of 90-95° C. and for 0.5-1.0 hour (8 and 9), the $Sc_2O_3$ content in the concentrate goes down to 23.5% (9).

Therefore, the proposed method for producing a scandium-containing concentrate enables a maximally high scandium concentration to be achieved in the concentrate while processing the red mud.

It is another object of the proposed invention to provide scandium oxide with a maximally high purity and minimal costs.

To achieve this object, a method is proposed for producing scandium oxide, comprising dissolving a scandium-containing concentrate in sulfuric acid, removing an acid-insoluble precipitate, bringing the concentration of sulfuric acid in the filtrate to 540-600 g/dm$^3$, precipitating scandium in the presence of an ammonium chloride compound at 50-70° C. while being kept for 1-2 hours with stirring, filtering, washing with ethanol at a volume ratio of 1-10÷11, drying and calcining to produce a scandium oxide precipitate.

Once the acid-insoluble precipitate is removed, scandium from the filtrate is precipitated with sodium sulfate in the form of a double salt of sodium and scandium sulfate, filtered out, the resulting precipitate is washed with a sodium sulfate solution, the double salt is dissolved in water and scandium hydroxide is precipitated with caustic soda, then the cake is filtered, washed and added to a solution of oxalic acid to obtain scandium oxalate using oxalic acid, filtered out and washed with water. For producing scandium oxide with a purity of ≥99 wt. %, scandium oxalate is calcined at a temperature not lower 650° C.

The main difference from the prototype is precipitating scandium in the form of a double salt sodium and scandium sulfate and reprecipitating scandium in the form of a hydroxide using caustic alkali. By the proposed method for producing a scandium-containing concentrate, it is possible to optimize the method for extracting scandium oxide from the resulting concentrate of a certain composition. The prototype uses a lean scandium concentrate with a $Sc_2O_3$ content of about 2 wt. % and for this reason various very complicated multistage repurification patterns are used. In particular, an operating procedure using a strong sulfuric acid is provided, making the requirements more stringent. Unlike the prototype, low-aggressive sodium sulfate is proposed for use as a precipitant (i.e. the equipment is not acid-resistant, working conditions are better, and it can be recycled) and the resulting double salt of sodium and scandium sulfate is highly selective with respect to the remaining impurities. Provided below are the examples of the repurification operation and modes:

Precipitating with Sodium Sulfate Double Salt

Dry sodium sulfate ($Na_2SO_4$) was added to a filtrate containing 30±5 g/dm³ of $Sc_2O_3$ to achieve $Na_2SO_4$ concentration=250±30 g/dm³. The double salt was synthesized at 70-80° C. for at least 1 hour and then cooled to a room temperature at which the double salt solubility becomes lower.

Filtering and Washing

The resulting precipitate was filtered at a room temperature and then the precipitate was washed with a sodium sulfate solution at $Na_2SO_4$ concentration of ~250±30 g/dm³. The washing solution consumption was 50 cm³ per 100 grams of the crystalline precipitate (i.e. at a ratio of 1:2 by weight), the washing temperature was 22±3° C.

Dissolving Double Salt

The double salt was dissolved with distilled water at 80±5° C. to obtain $Sc_2O_3$ concentration in the solution of ~20-25 g/dm³.

Precipitating Scandium Hydroxide

Scandium hydroxide was precipitated using a concentrated (45%) solution of NaOH at a room temperature. The resulting precipitate was washed with distilled water at a room temperature. The water consumption was 50 cm³ of the solution per 100 grams of $Sc_2O_3$ (i.e. at a ratio of 1:2 by weight).

Producing Scandium Oxalate

Scandium hydroxide was turned into scandium oxalate by treating the precipitate with a solution of oxalic acid ($H_2C_2O_4$) at a concentration of 100 g/dm³ at 70-80° C.

Filtering and Washing Scandium Oxalate

The resulting scandium oxalate was filtered at a room temperature. The precipitate was washed with distilled water at ratio of 1:1 (by weight) at a room temperature.

The method for producing a $Sc_2O_3$ is illustrated by the following example.

50 g of a scandium-containing concentrate with the following composition, wt. %: $Sc_2O_3$—52.1; $TiO_2$—0.95; $Fe_2O_3$—1.7; $ZrO_2$—2.6; $Na_2O$—3.2; CaO—2.1; Si—0.4 was provided; pulpified in 840 dm³ of water, 27 cm³ of 94% sulfuric acid was added and dissolved at 60° C. An acid-insoluble precipitate was removed from the solution and the concentration of sodium sulfate in the filtrate was adjusted to $Na_2SO_4$=250±30 g/dm³. The resulting pulp comprising a scandium double salt and a liquid phase was kept while being stirred at 70-80° C. for 1 hour. Then 108.5 g of scandium double salt crystals were filtered, 200 dm³ of a sodium sulfate solution with a $Na_2SO_4$ concentration of 250 g/dm³ were filter washed at a room temperature (22±3° C.). The resulting scandium double salt crystals washed of interstitial moisture containing concomitant impurities were dissolved in 1032 dm³ of water at 80±5° C.). A 45% solution of NaOH was added to the resulting scandium-containing solution, and scandium hydroxide was precipitated at a room temperature and solution pH of 6.5±7.0. The precipitated scandium hydroxide was separated from the precipitant mother solution by filtration, the hydroxide whose weight is 203 g was filter washed with 100 dm³ of water following which it was added to 550 dm³ of an oxalic acid solution with a $H_2C_2O_4$ concentration of 100 g/dm³. The resulting pulp comprising a liquid phase and scandium oxalate was kept at 70-80° C., then filtered, scandium oxalate was washed with water, dried at 120° C. for 2 hours until a constant weight was obtained and calcined at 850° C. for 1 hour. Scandium oxide was obtained with a purity of 99.5% and a yield of 98.3%. Scandium losses amounted to 1.7%.

Therefore, the proposed method for producing scandium oxide enables a maximum degree of purity to be achieved at minimum costs.

The invention claimed is:

1. A method for producing a scandium-containing concentrate from a red mud, said method comprising the steps of:
   a) filtering the red mud from a liquid phase to form a first red mud cake;
   b) repulping the first red mud cake with a first sodium hydrocarbonate solution to form a red mud pulp, wherein the first sodium hydrocarbonate solution comprises a mixture of $Na_2CO_3$ and $NaHCO_3$;
   c) gassing the red mud pulp from step b) with carbon dioxide until a pH of ≤9 is reached;
   d) leaching the red mud pulp from step c) with a second sodium hydrocarbonate solution; wherein the second sodium hydrocarbonate solution comprises a mixture of $Na_2CO_3$ and $NaHCO_3$;
   e) filtering the red mud pulp from step d) to obtain a second red mud cake and a filtrate and washing the second red mud cake with water to obtain a washing solution;
   f) sorbing scandium from the filtrate on a phosphorous-containing ion exchanger;
   g) desorbing scandium from the phosphorous-containing ion exchanger with a soda solution at 20-80° C. to obtain a strippant rich in scandium, wherein the soda solution comprises a sodium carbonate solution having a $Na_2CO_3$ concentration of 160 to 450 g/dm³; and
   h) performing at least a first hydrolysis stage on the strippant rich in scandium obtained from step g) to obtain a scandium-containing concentrate wherein the scandium-containing concentrate has a $Sc_2O_3$ content that is at least 15 wt. % in terms of dry matter, has a $TiO_2$ content not more than 3 wt. % in terms of dry matter, and has a $ZrO_2$ content not more than 15 wt. % in terms of dry matter, and wherein scandium in the scandium-containing concentrate is a mixture of $Sc(OH)_3$ hydroxide with $ScOHCO_3 \cdot 4H_2O$.

2. The method according to claim 1, wherein the leaching step d) is performed at a temperature of 80-85° C.

3. The method according to claim 1, wherein in the first or second sodium hydrocarbonate solution, the concentration of $Na_2O_{total}$ in the second sodium hydrocarbonate solution is ≥60 g/dm³ and wherein $Na_2O$ bicarbonate amounts to 50-100% of $Na_2O_{total}$.

4. The method according to claim 1, wherein the scandium is sorbed in step f) at a temperature of 40-100° C.

5. The method according to claim 1, wherein the desorbing in step g) occurs at a temperature of 40-45° C.

6. The method according to claim 1, further comprising a second hydrolysis stage performed after the first hydrolysis stage wherein in the first hydrolysis stage, impurity components are precipitated at a pH of 10.5-12.0 and at a temperature of 60-80° C., and at the second hydrolysis stage, scandium concentrate is precipitated at a pH of 12.5-13.5 and at a temperature of 70-80° C.

7. The method according to claim 1, wherein the solution resulting from the leaching of the red mud in step d), once scandium is sorbed from the solution, is gassed with an air-gas mixture containing $CO_2$ at 30-40° C. and is recycled for leaching of a fresh batch of red mud.

8. The method according to claim 1, wherein a weight ratio between $Sc_2O_3$ and $TiO_2$ in the scandium-containing concentrate is further adjusted to at least 5:1 by weight.

9. The method according to claim 1, wherein a weight ratio between $Sc_2O_3$ and $ZrO_2$ in the scandium-containing concentrate is adjusted to at least 1.5:1 by weight.

10. The method according to claim 1, wherein the washing solution in step e) is recycled for repulping in step b).

11. A scandium-containing concentrate produced by a carbonate sorption hydrolysis process, comprising a mixture of scandium, titanium, zirconium, iron, sodium oxides, hydroxides and carbonates, characterized in that the concentrate has a $Sc_2O_3$ content that is at least 15 wt. % in terms of dry matter, has a $TiO_2$ content not more than 3 wt. % in terms of dry matter, has a $ZrO_2$ content not more than 15 wt. % in terms of dry matter, wherein scandium is present in the concentrate as a mixture of $Sc(OH)_3$ with $ScOHCO_3.4H_2O$.

12. The scandium-containing concentrate according to claim 11, wherein a weight ratio between $Sc_2O_3$ and $TiO_2$ in the concentrate is at least 5:1 by weight.

13. The scandium-containing concentrate according to claim 11, wherein a weight ratio between $Sc_2O_3$ and $ZrO_2$ in the concentrate is at least 1.5:1 by weight.

14. A method for producing a high-purity scandium oxide, said method comprising:
   a) dissolving a scandium-containing concentrate in sulfuric acid to form a scandium-containing concentrate solution;
   b) removing an acid-insoluble precipitate that formed in the scandium concentrate solution in step a)
   c) precipitating the scandium concentrate solution after step b) with sodium sulfate to obtain $Na_3Sc(SO_4)_3$;
   d) filtering and washing the $Na_3Sc(SO_4)_3$ obtained in step c);
   e) dissolving the $Na_3Sc(SO_4)_3$ with water;
   f) adding NaOH to the $Na_3Sc(SO_4)_3$ dissolved with water to cause precipitation of $Sc(OH)_3$;
   g) filtering and washing to obtain a cake of $Sc(OH)_3$;
   h) adding oxalic acid to the cake of $Sc(OH)_3$ to form scandium oxalate;
   i) filter and washing the scandium oxalate;
   j) calcining the scandium oxalate to obtain scandium oxide having a purity of approximately 99 wt. %;
   wherein $Sc_2O_3$ content in the scandium-containing concentrate is at least 15 wt. % in terms of dry matter, $TiO_2$ content is not more than 3 wt. % in terms of dry matter, $ZrO_2$ content is not more than 15 wt. % in terms of dry matter, and scandium in the scandium-containing concentrate is a mixture of $Sc(OH)_3$ with $ScOHCO_3.4H_2O$.

15. The method according to claim 14, wherein the calcining step is performed at a temperature not lower than 650° C.

* * * * *